(12) United States Patent
Hayashi

(10) Patent No.: US 6,655,625 B2
(45) Date of Patent: Dec. 2, 2003

(54) MAGNETIC TAPE CARTRIDGE

(75) Inventor: Yoichi Hayashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 26 days.

(21) Appl. No.: 10/073,319

(22) Filed: Feb. 13, 2002

(65) Prior Publication Data
US 2002/0084372 A1 Jul. 4, 2002

Related U.S. Application Data

(62) Division of application No. 09/622,573, filed on Aug. 18, 2000, now Pat. No. 6,488,223.

(30) Foreign Application Priority Data
Feb. 18, 1998 (JP) ............................................. 10-036170

(51) Int. Cl.⁷ ............................................. G11B 23/107
(52) U.S. Cl. ................................... 242/348.2; 360/132
(58) Field of Search ............................... 242/348, 348.2; 360/132

(56) References Cited

U.S. PATENT DOCUMENTS 5,610,789 A    3/1997   Miller

FOREIGN PATENT DOCUMENTS

EP      0 537 714      4/1993
WO      WO 83 04453    12/1983

OTHER PUBLICATIONS

Japanese Abstract No. 09 274787, dated Oct. 21, 1997.
Japanese Abstract No. 09 274785, dated Oct. 21, 1997.

Primary Examiner—John Q. Nguyen
(74) Attorney, Agent, or Firm—Sughrue Mion, PLLC

(57) ABSTRACT

A magnetic tape cartridge comprises: a cartridge case including an opening portion, an upper cartridge and a lower cartridge, the upper cartridge having a supporting shaft; a reel, around which a magnetic tape can be wound, accommodated in the cartridge case, wherein the magnetic tape can be drawn out from the opening portion of the cartridge case; a lid pivotably attached to the supporting shaft in order to open and close the opening portion; and a lid spring being a torsion coil spring having a coil portion through which the lid spring is attached to the supporting shaft so as to urge the lid to close the opening portion. In the magnetic tape cartridge, it is preferable that the coil portion is a compressive spring. Alternatively, it is also preferable that one leg portion of the lid spring is supported by a frame formed on at least one of the upper cartridge and the lower cartridge, and the other leg portion of the lid spring is supported by a protruding portion provided for the lid so that a portion of the other leg portion adjacent to an end portion thereof is brought into contact with the protruding portion.

3 Claims, 11 Drawing Sheets

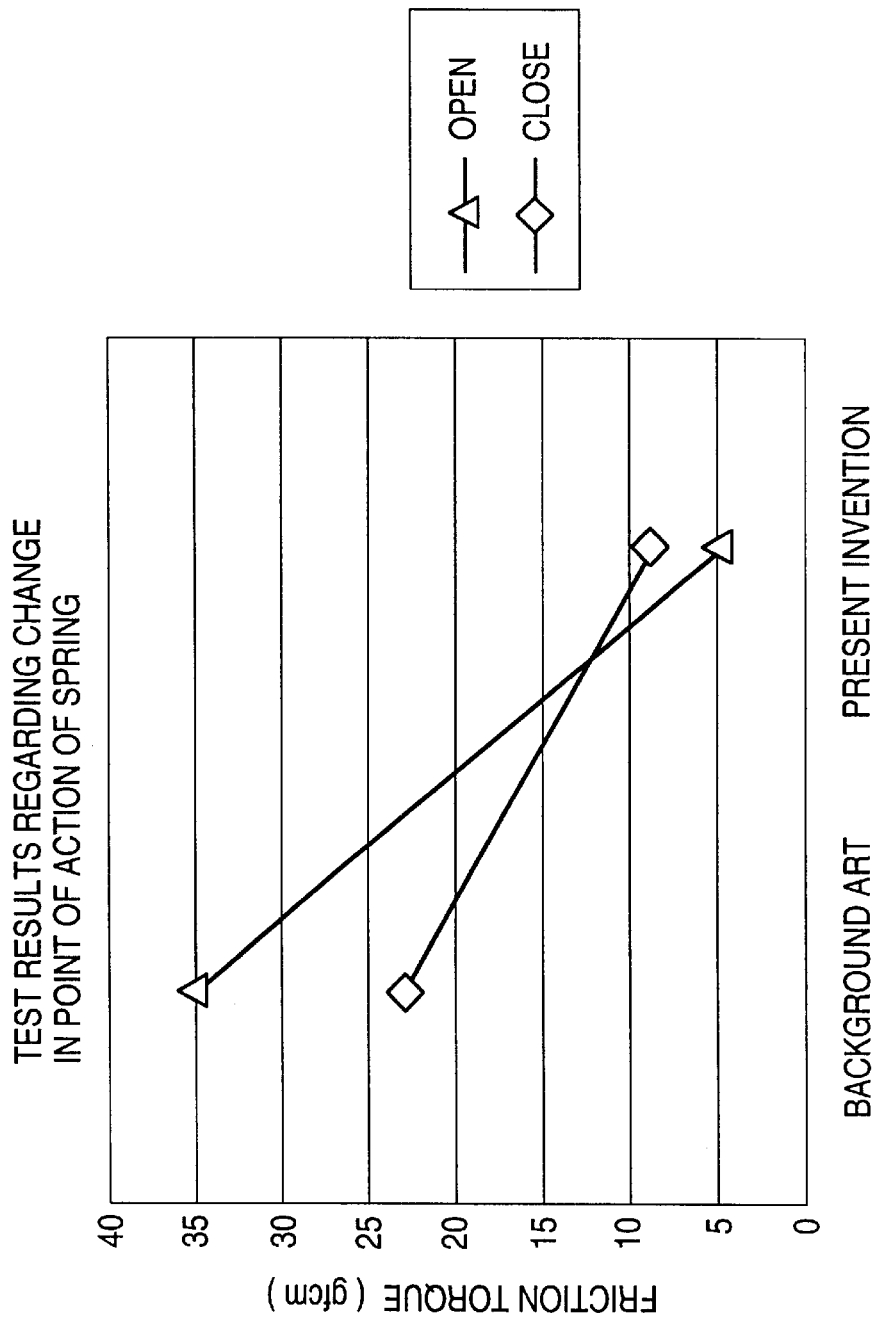

MAGNETIC TAPE CARTRIDGE

This is a divisional of application Ser. No. 09/622,573 filed Aug. 18, 2000, now U.S. Pat. No. 6,488,223; the disclosure of which is incorporated herein by reference.

TECHNICAL FIELD

The present invention relates to a magnetic tape cartridge having a lid that can open and closes an opening portion for drawing out a magnetic tape.

The present application is based on Japanese Patent Applications Nos. Hei. 10-36170, 10-79455 and 10-350136, the contents of which are incorporated herein by reference.

BACKGROUND ART

A magnetic tape cartridge has been used as recording medium for computers etc. As an example of such the magnetic tape cartridge, there has been known a magnetic tape cartridge which comprises: a reel; a magnetic tape wound around the reel; and a cartridge case including an upper cartridge and a lower cartridge, wherein the reel is accommodated in the cartridge case so as to be able to rotate. A lid is pivotably attached to the cartridge case so as to be able to open and close an opening portion formed in the cartridge case. When the magnetic tape cartridge is used, the opening portion is opened by the lid so that the magnetic tape may be drawn out of an opening portion.

When the magnetic tape cartridge is not used, the opening portion is closed by the lid. At this stage, a leader tape attached to a tape end is locked at an end surface of the cartridge case in such a state that the magnetic tape is fully wound up onto the reel while the reel is locked by such a lock component as a reel lock so as to prevent unexpected rotations of the reel. Incidentally, the leader tape is an engagement mechanism for such an apparatus as a computer to introduce the magnetic tape into a tape path.

The lid and the locking structure thereof will be described. In the cartridge case described above, the magnetic tape is wound around the reel rotatably mounted, and the leader tape is positioned at the opening portion when the lid closes the opening portion. The reel is comprised of a set of upper and lower reels, in which a gear portion is formed on the outer circumferential portion of the upper reel.

FIG. 1 shows a basic attachment structure of a lid 60. As shown in FIG. 1, the lid 60 is mounted on an upper cartridge 2a through a supporting shaft 14. The lid 60 is urged by a lid spring 65 in a closing direction as indicated by an arrow A. The lid spring 65 is attached to the supporting shaft 14 through a coil portion 65c thereof, and one leg portion 65b is supported by the frame 2d of the upper cartridge 2a while the other leg portion 65a is supported by a recessed portion 67 formed in the lid 60.

The lid 60 has a hole 61 into which a lid lock member 70 for locking the opening or closing actions of the lid 60 is inserted. The lid lock member 70 can vertically slide in the hole 61 in a cartridge thickness direction. The lid lock member 70 is located adjacent to the supporting shaft 14 when the lid 60 is mounted on the upper cartridge 2a. As shown in FIG. 1, the lid lock member 70 is urged by an upward force of a lid lock spring 16 in a direction indicated by an arrow U, to lock the lid 60 so as not to open by the upper end thereof being engaged with a recessed portion formed in the lower cartridge (not shown) when the magnetic tape cartridge is not used.

To ensure high accuracy and flame resistance, the lid 60 and the cartridge case are respectively made of a composite material of polycarbonate and glass fiber. The lid lock member 70 is made of a material excellent in sliding effect, such as POM, in order to reduce friction. The supporting shaft 14 is molded as a part of the upper cartridge 2a for the reasons of accuracy and costs. A shaft hole 63 through which the supporting shaft 14 is passed is molded as a part of the lid 60 for the reasons of accuracy and costs.

FIG. 2 shows positional and kinetic relationship between the lid 60 and the lid spring 65 in a static state where the lid is opened while a certain torque is being loaded on the lid spring 65. As for the kinetic relationship while the lid 60 is opened, a torque Ts1 of the lid spring 65 is applied to the spring bearing portion 68 of the lid 60 to generate a spring force F6. An opening force F5 is applied to the lid 60 through a release lever (not shown) for opening the lid 60. A load F7 is applied on the supporting shaft 14. The load F7 is a difference between the forces F6 and F5. In this magnetic tape cartridge, the Ts1 is set as 140 gfcm in view of parameters of a lid spring which is generally utilized in this magnetic tape cartridge. A radius r of the supporting shaft 14 is 0.2 cm. A distance d1 from the center of the supporting shaft 14 to a point of action of the force F6 is 0.3 cm. A distance d2 from the center of the supporting shaft 14 to a point of action of the force F5 is 1.1 cm.

A relationship among T (torque), F (force), and d (distance) is defined as follows:

$$T \text{ (torque)} = F \text{ (force)} \times d \text{ (distance)}$$

In view of the above, the specific values of F6 and F5 are defined as follows:

$$F6 = Ts1/d1 = 467 \text{ gf}$$

$$F5 = Ts1/d2 = 127 \text{ gf}$$

Further, the specific value of F7 is defined based on balance of the forces as follows:

$$F7 = F6 - F5 = 340 \text{ gf}$$

Accordingly, if a static friction coefficient $\mu$ of the resin is set as 0.52, a friction torque Tf1 of the supporting shaft 14 is defined as follows:

$$Tf1 = F7 \times \mu \times r = 35 \text{ gfcm}$$

FIG. 3 shows positional and kinetic relationship between the lid 60 and the lid spring 65 in a static state where the lid 60 is closed. As for the kinetic relationship while the lid 60 is closed, a torque Ts2 of the lid spring 65 is applied to the spring bearing portion 68 of the lid 60 to generate a spring force F2. A counter force Fe is applied from the leader tape 21 to the lid 60. A load F3 applied to the supporting shaft 14 is a sum of F2 and Fl. Incidentally, in this magnetic tape cartridge, the Ts2 is 60 gfcm and the force Fl is 8 gf while the distance d3 from the center of the supporting shaft 14 to a point of action of the force Fl is 4.5 cm.

In view of the above, the specific value of F2 is defined as follows:

$$F2 = Ts2/d1 = 200 \text{ gf}$$

Therefore, the specific value of F3 is defined based on balance of the forces as follows:

$$F3 = F2 + Fl = 208 \text{ gf}$$

Accordingly, a friction torque Tf2 of the supporting shaft 14 is defined as follows:

$$Tf2 = F3 \times \mu \times r = 22 \text{ gfcm}$$

As a result, a spare torque Tt of the lid spring 65 in the close state of the lid 60 is defined as follows:

$$Tt = Ts2 - (Tf2 + T1) = 2 \text{ gfcm}$$

(wherein T1=8×4.5=36 gfcm)

That is, the closing action of the lid 60 is maintained by the above torque Tt.

As described above, the material, represented by such as polycarbonate which can ensure the high accuracy and the flame resistance, has a large friction coefficient as a synthetic resin (friction coefficient $\mu$=0.4 to 0.6). Therefore, the lid 60 may be stopped in the middle of the pivotal action due to the rotational resistance between the supporting shaft 14 and the shaft hole 63. Further, there is a possibility in that the load is increased on the drive of an apparatus, such as a computer, when the lid 60 is pivoted.

Additionally, when the lid 60 is opened, since the lid lock member 70 moves while the lid lock member 70 is being pushed toward the upper cartridge 2a by the door releasing lever of the drive, thrust friction between the lid 60 and the upper cartridge 2a increases, and therefore the opening operation may require more force and friction powder may be generated. On the other hand, when the lid 60 is closed, since the lid lock member 70 pushes the lower cartridge, the friction occurs between the lid lock member 70 and the lower cartridge, and further, the thrust friction is caused between the lid 60 and the upper cartridge 2a by a counter force applied to the lid 60 by the lid lock member 70. Since the lid 60 and the cartridge case are made of polycarbonate etc. having a large friction coefficient, an imperfect closure of the lid 60 may be caused due to the friction forces as described above, and further, such a serious trouble as a drop out may be caused by the generated friction powder etc.

As described above, such the small spare torque Tt of the lid spring 65 as 2 gfcm is considered to be the reason for the imperfect closure of the lid 60. However, if the spring force of the lid spring 65 itself is increased as a countermeasure against the imperfect closure, the load on the supporting shaft 14 may be increased and the friction may be also increased.

When the force applied to the lid by the lid spring itself is merely increased, the force required for release of the lid is increased, and further, the friction is increased. In addition, the increase in the size of the lid spring itself also increases the storage space for the lid spring. Moreover, after the lid is opened and closed for a large number of times, the friction powder may be generated. The friction powder may result with such a serious trouble as a drop out.

It is possible to eliminate such possibilities as described above by utilization of a material with a better sliding effect, such as polyacetal, in the supporting shaft 14 and also in the shaft hole 63. However, to prevent degradation in the flame resistance and accuracy of the cartridge and the lid, it is necessary to mold the upper cartridge 2a and the supporting shaft 14, as well as the lid 60 and the shaft hole 63, into separate structures or into two colors. In this case, however, there are disadvantages in the accuracy and the costs.

DISCLOSURE OF THE INVENTION

The present invention has been made in view of the background as described above, and an object of the invention is to provide a magnetic tape cartridge realizing smooth pivot of the lid at low cost.

To achieve the above object, according to the first aspect of the present invention, there is provided a magnetic tape cartridge which comprises: a cartridge case including an opening portion, an upper cartridge and a lower cartridge, the upper cartridge having a supporting shaft, and the lower cartridge having a recessed portion; a reel, around which a magnetic tape can be wound, accommodated in the cartridge case, wherein the magnetic tape can be drawn out from the opening portion of the cartridge case; a lid pivotably attached to the supporting shaft in order to open and close the opening portion; a lid spring being a torsion coil spring having a coil portion which is a compressive spring, the lid spring being attached to the supporting shaft through the coil portion so as to urge the lid to close the opening portion; and a lid lock member urged toward the lower cartridge by a lid lock spring so as to be engaged with the recessed portion of the lower cartridge, wherein, when the lid lock member engages with the recessed portion, the lid lock member locks the lid to close the opening portion, and, when the lid lock member is disengaged from the recessed portion, the lid can pivot.

According to the first aspect of the present invention, when the lid is opened, compression of the coil portion results with the counter force working to counter the thrusting force of the release lever and therefore the friction loss between the lid and the upper cartridge is reduced. On the contrary, when the lid is closed, since the lid lock member pushes the lower cartridge, although there is a slight friction between the lower cartridge and the lid lock member made of a low friction coefficient material excellent in sliding effect, a force is generated due to compression of the coil portion and counters the counter force in which the lid lock member pushes the lower cartridge, and therefore the friction loss between the lid and the upper cartridge is reduced. Therefore, the lid can pivot smoothly without being stopped halfway in the course of pivotal movement by the rotational resistance. Additionally, this is realized only by adoption of the compressive spring for the coil portion of the lid spring, and therefore no substantial increase in the cost will result.

The compressive spring herein is a spring which is compressible at the coil portion thereof even if it may resemble ordinary torsion coil springs in the appearance thereof.

Further, according to the second aspect of the present invention, it is preferable that a compressive force of the coil portion of the lid spring is set to be equal to or higher than an urging force in which the lid lock spring urges the lid lock member when the lid closes the opening portion of the cartridge case.

Further, according to the third aspect of the present invention, it is preferable that a compressive force of the coil portion of the lid spring is set to be 1.2 times to 1.5 times higher than an urging force in which the lid lock spring urges the lid lock member when the lid closes the opening portion of the cartridge case.

Still further, to achieve the above object, according to the fourth aspect of the present invention, there is provided a magnetic tape cartridge which comprises: a cartridge case including an opening portion, an upper cartridge and a lower cartridge, the upper cartridge having a supporting shaft; a frame formed on at least one of the upper cartridge and the lower cartridge; a reel, around which a magnetic tape can be wound, accommodated in the cartridge case, wherein the magnetic tape can be drawn out from the opening portion of the cartridge case; a lid pivotably attached to the supporting shaft in order to open and close the opening portion, the lid including a protruding portion; and a lid spring being a torsion coil spring having a coil portion through which the lid spring is attached to the supporting shaft so as to urge the lid to close the opening portion, one leg portion supported by the frame, and the other leg portion supported by the protruding portion of the lid so that a portion of the other leg portion adjacent to an end portion thereof is brought into contact with the protruding portion.

Accordingly, the load on the supporting shaft can be reduced. Consequently, the friction torque of the supporting shaft can be reduced to result with the reduction in the generation of friction powder and with the smooth pivot of the lid. Additionally, this is realized only by provision of the protruding portion on the lid alone and thus no substantial increase in the cost will result. Moreover, since the lid spring is supported at the portion adjacent to the leg end, the torque which applies a force in the direction to close the lid is increased, and therefore, the above-described imperfect closure of the lid can be eliminated.

Further, according to the fifth aspect of the present invention, the protruding portion may have an approximately square prism shape. Furthermore, according to the sixth aspect of the present invention, the lid may include a recessed portion in which the protruding portion is formed.

BRIEF DESCRIPTION OF DRAWINGS

FIG. 14 is a graph showing a comparison between the friction torques respectively working on the supporting shafts of the embodiment shown in FIGS. 10–13 and the background art when the lids are opened and closed.

BEST MODE FOR CARRYING OUT THE INVENTION

Figure 4:
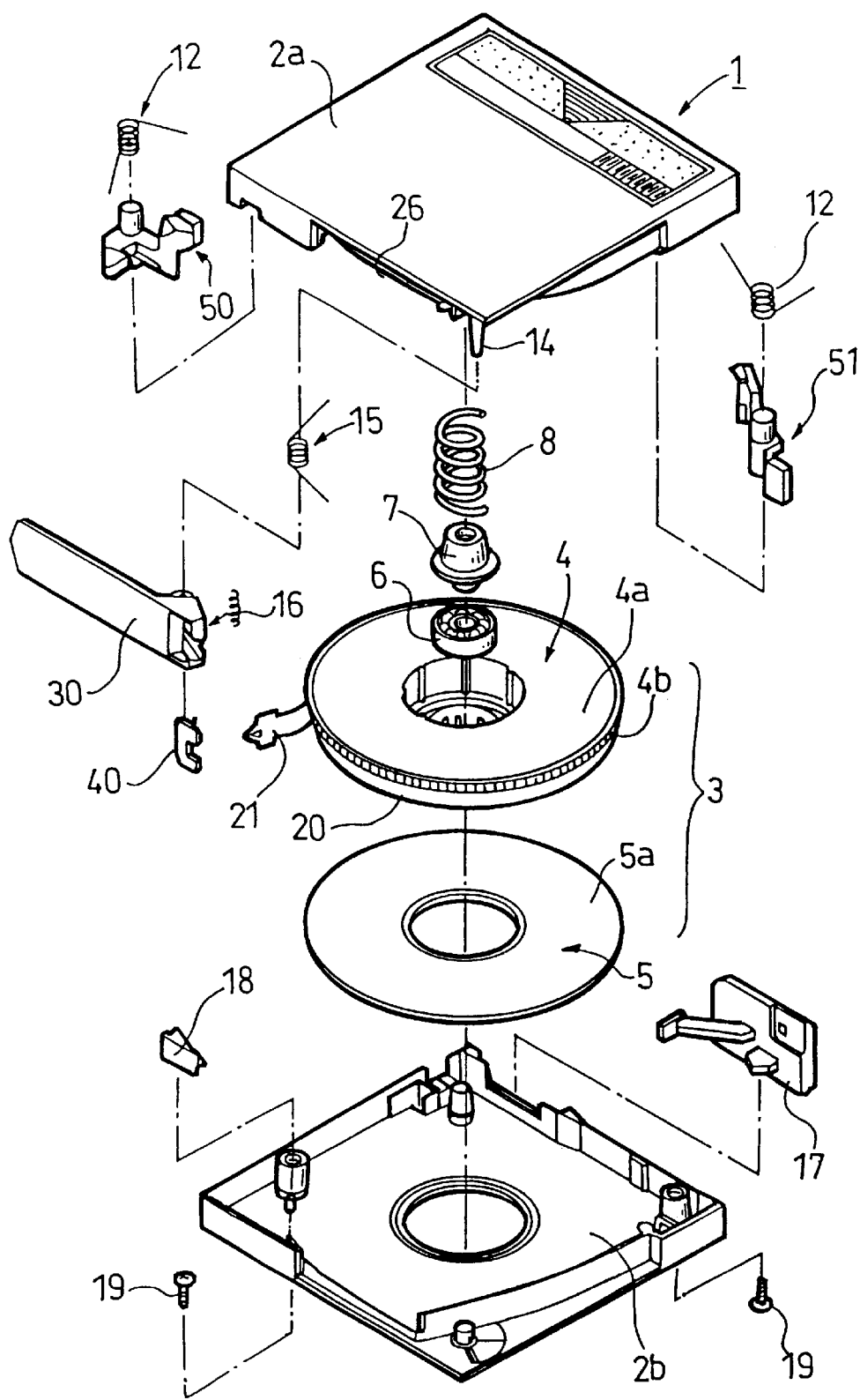
FIG. 4 is an exploded perspective view showing a first embodiment of the magnetic tape cartridge according to the present invention.

The best mode for carrying out the present invention will now be described with reference to FIGS. 4 to 14. FIG. 4 is an exploded perspective view showing a first embodiment of the magnetic tape cartridge according to the present invention. A magnetic tape cartridge 1 comprises: a magnetic tape 20 wound around a single reel 3; and a cartridge case accommodating the reel 3 so as to be able to rotate in the cartridge case. The reel 3 includes an upper reel 4 and a lower reel 5 which are combined by such a method as ultrasonic welding. The cartridge case includes an upper cartridge 2a and a lower cartridge 2b which are tightened with screws 19.

The upper reel 4 of the reel 3 has an upper flange 4a. A recessed portion is provided at the center of the upper flange 4a. The upper flange 4a has a gear portion 4b formed on an outer circumferential portion thereof. A ring-shaped bearing 6 is press-fitted into and secured to a circular rib which is formed inside the recessed portion of the upper flange 4a. A spring plug 7 is press-fitted into and secured to a hole formed at a center of the bearing. A reel spring 8 is attached to the spring plug 7 so that the reel 3 is pressed downward and is rotatably held.

When the magnetic tape cartridge 1 is not used, the reel 3 is locked to prevent unexpected rotation by reel locks 50 and 51 which are urged with some appropriate force by a reel lock spring 12. In addition, a leader tape attached to a tape end is locked at a tip portion of a hook 18 which is attached at a position close to a lateral side of the lower cartridge 2b in such a state that the magnetic tape 20 is fully wound up onto the reel 3. Incidentally, the leader tape is an engagement mechanism for such an apparatus as a computer to introduce the magnetic tape 20 into a tape path.

A lid 30 is attached to an opening portion 26 formed to lead the magnetic tape 20. The lid 30 is urged with some appropriate force by a lid spring 15 which is a torsion coil spring, so that the lid 30 can open and close the opening portion 26 in a direction along a plane of the cartridge. When the magnetic tape cartridge 1 is not used, the lid 30 is locked so as not to be opened by a lid lock member 40 which is pushed with some appropriate force toward the lower half 2b by a lid lock spring 16. The leader tape 21 is joined to the magnetic tape by such a method as splice, and engages with an engagement component for introducing the magnetic tape 20 into the tape path of a recording/reproducing apparatus.

Figure 5:
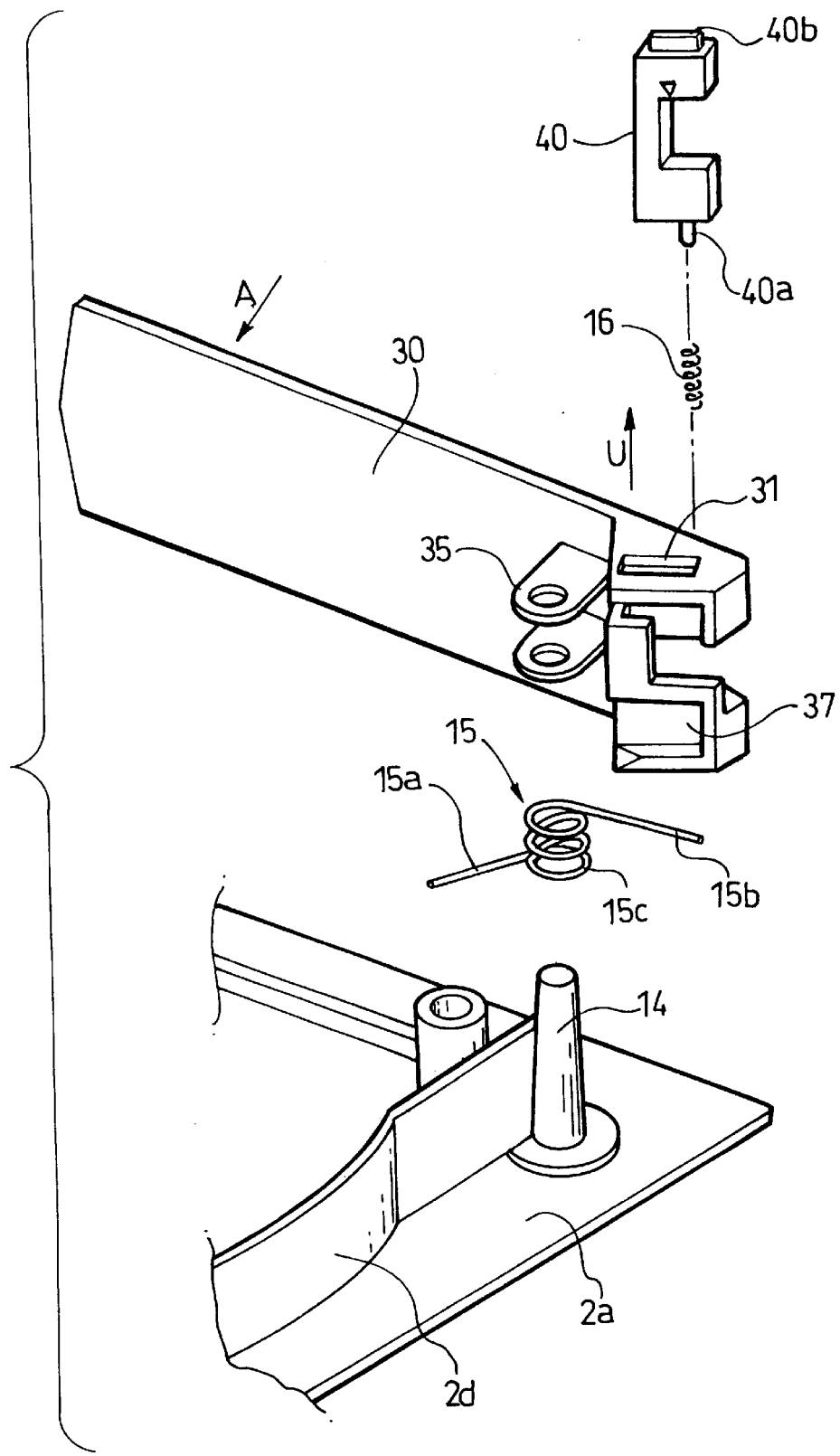
FIG. 5 is a basic attachment structure of a lid of the first embodiment according to the present invention.

FIG. 5 shows a basic attachment structure of the first embodiment of the lid according to the present invention. As shown in the FIG. 5, the lid 30 is mounted on a supporting shaft 14 and urged with a force in the closing direction indicated by an arrow A by the lid spring 15. The lid spring 15 is a compressive spring in which a coil portion 15c thereof is formed in a spacing turn manner. The lid spring 15 is attached to the supporting shaft 14 through the coil portion 15c thereof, and one leg portion 15a is supported by a frame 2d of the upper cartridge 2a while the other leg portion 15b is supported by a recessed portion 37 formed in the lid 30. Since this is realized by adoption of the compressive spring for the coil portion 15c of the lid spring 15, no substantial increase in the cost will result in comparison with a background one.

Figure 6:
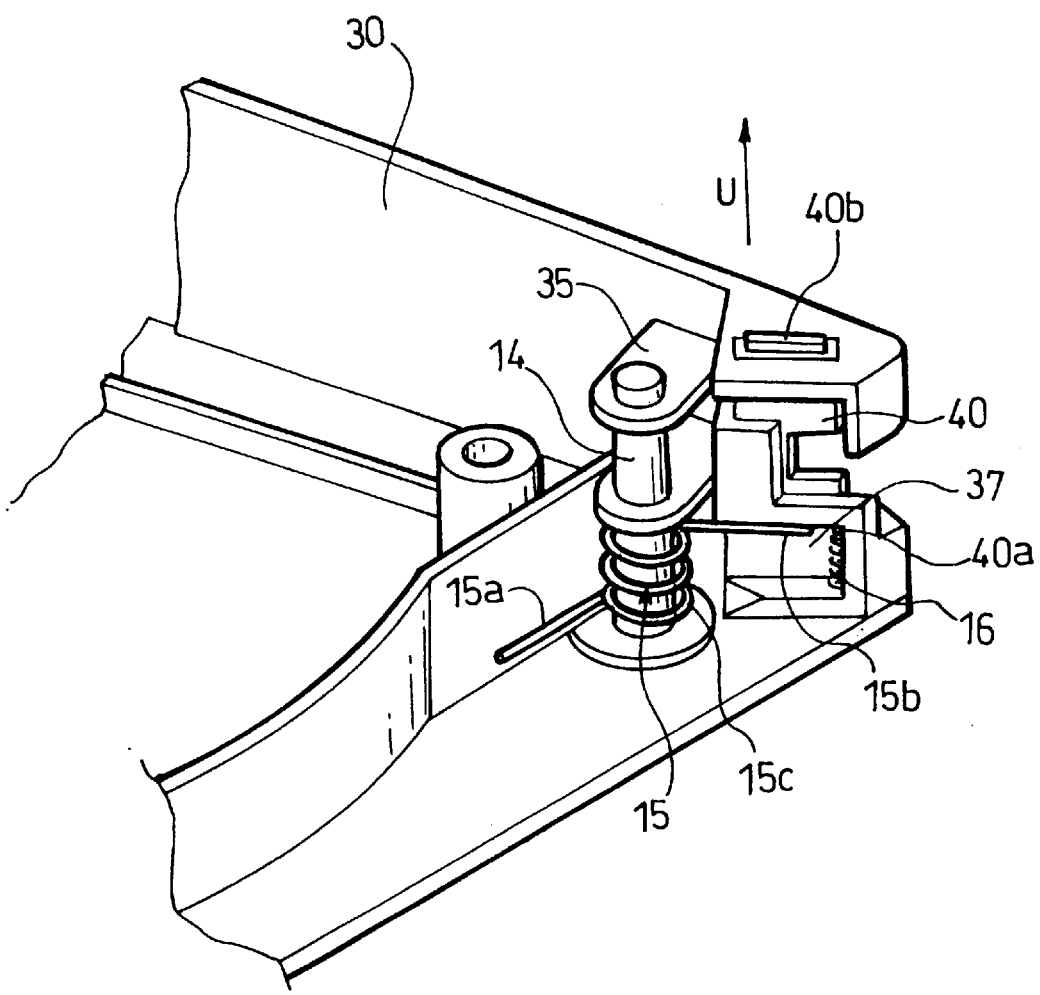
FIG. 6 shows a state in that a lid spring and the lid of FIG. 5 are attached onto a supporting shaft.

FIG. 6 shows a state in that the lid spring 15 and the lid 30 are mounted onto the supporting shaft 14. As shown in FIGS. 5 and 6, the lid 30 has a hole 31 into which the lid lock member 40 for locking the opening and closing actions of the lid 30 is inserted. The lid lock spring 16 is attached to the lid lock member 40 so that a boss 40a of the lid lock member 40 is inserted into the lid lock spring 16. The lid lock member 40 can vertically slide in the hole 31, and is urged by an upward force of the lid lock spring 16 in a direction indicated by an arrow U so that an upper end portion 40b of the lid lock member 40 protrudes from the hole 31. Further, the protruded upper end portion 40b is engaged with the recessed portion formed in the lower cartridge 2b, so that the lid 30 cannot pivot.

Figure 7:
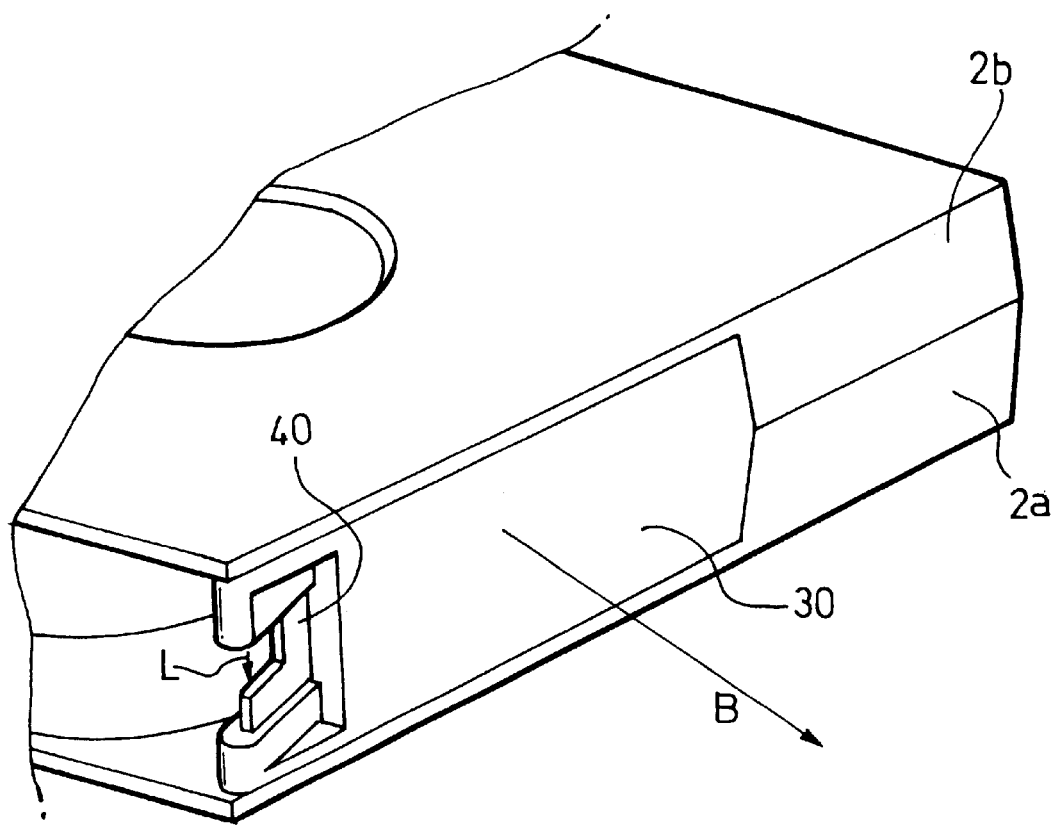
FIG. 7 is an enlarged view showing an assembled state of the magnetic tape cartridge.

As shown in FIG. 7, when opening the lid 30, the lid lock member 40 is pushed downward by a release lever of the drive in a direction of an arrow L (i.e., toward the upper cartridge 2a), and the lid 30 is pivoted in a direction of an arrow B. Although the urging force is applied to the lid 30 in the direction of the allow L due to the push of the release lever, since the coil portion 15c of the lid spring 15 is the compressive spring, a counter force in a direction opposite to the allow L is obtained due to the compression of the coil portion 15c. Therefore, friction loss by contact of the lid 30 and the upper cartridge 2a can be reduced.

On the other hand, when closing the lid 30, since the lid lock member 40 is abutted against the lower cartridge 2b by an urging force of the lid lock spring 16, the lid 30 is pushed toward the upper cartridge 2a due to the urging force. However, since the coil portion 15c of the lid spring 15 can be compressed also in this case, the friction loss between the lid 30 and the upper cartridge 2a, both of which are made of the material represented by such as polycarbonate etc. having a large friction coefficient, can be reduced by a counter force of the coil portion 15c countering the urging force of the lid lock spring 16. According to this construction, since the friction between the lid 30 and the upper cartridge 2a can be reduced, there is no possibility in that the lid 30 is stopped halfway in the pivotal movement by the rotational resistance, and such a problem as imperfect closure will not occur, and therefore, the lid can pivot smoothly. Here, the lid lock member 40 is made of a low friction coefficient material excellent in sliding effect, such as POM, and therefore, the friction force is small and friction powder is not generated even if the lid lock member 40 is brought into contact with the lower cartridge 2b.

It is preferable that the compressive force of the coil portion 15c is equal to or higher than an urging force in which the lid lock spring 16 urges the lid lock member 40 when the lid 30 closes the opening portion 26 of the cartridge case. In other words, it is preferable that the compressive force of the coil portion 15c is equal to or higher than the urging force generated by the lid lock spring 16 when the upper end portion 40b of the lid lock member 40 is engaged with the recessed portion formed in the lower cartridge 2b so that the lid 30 cannot pivot. Incidentally, it is more preferable that the compressive force of the coil portion 15c is 1.2 times to 1.5 times higher than the urging force generated by the lid lock spring 16. Additionally, since the lid lock member 40 is made of a material excellent in sliding effect, such as POM, the friction coefficient thereof is smaller than the lid 30. This is intended because it is preferable that the contact surface of the lid 30 is away from the contact surface of the upper cartridge 2a. Namely, it is preferable that the lid 30 is urged toward the lower cartridge 2b so that the contact surface of the lid 30 is away from the contact surface of the upper cartridge 2a. This is also effective in ensuring the lock of the lid 30. However, it is necessary to adjust the compressive force of the coil portion 15c appropriately in the movable range of the lid lock member 40.

Figure 8:
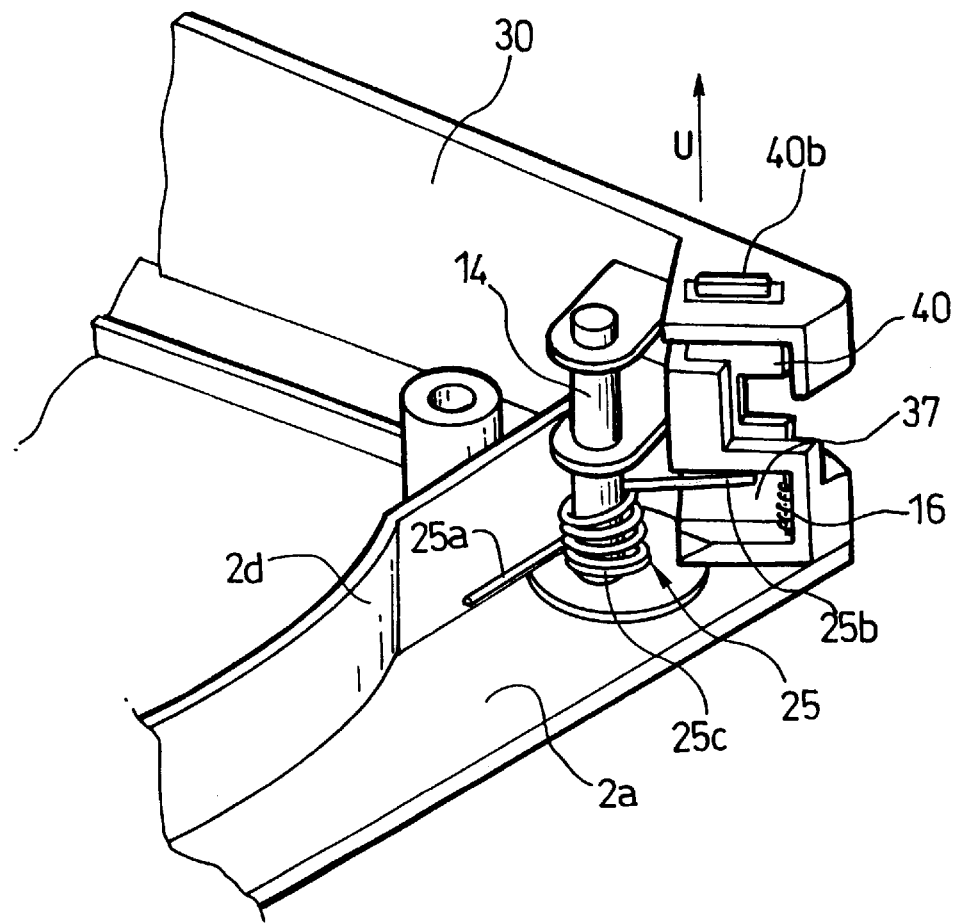
FIG. 8 is a basic attachment structure of a lid of a second embodiment according the present invention.
Figure 9:
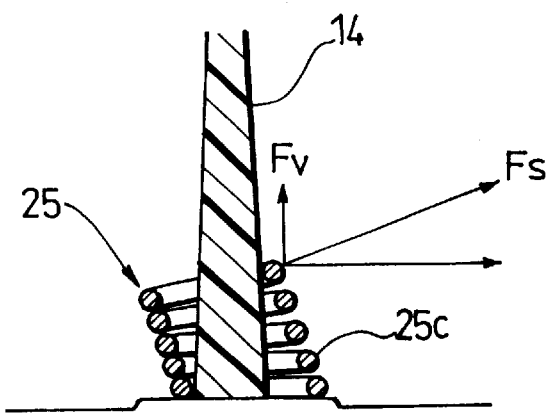
FIG. 9 shows kinetic relationship when a lid spring of the second embodiment according to the present invention is attached onto a supporting shaft of an upper cartridge.

With reference to FIGS. 8 and 9, a second embodiment of the present invention will be described in detail. As shown in FIG. 8, although the construction of the lid 30 is the same as in the first embodiment, the inner diameter of a coil portion 25c of the lid spring 25 is 1.5 times or more than the outer diameter of the supporting shaft 14 of the upper cartridge 2a.

That is, the inner diameter of the coil portion 25c of the lid spring 25 is larger than the lid of the background art, when compared. The lid spring 25, which is a torsion coil spring, includes one leg portion 25a supported by a frame 2d of the upper cartridge 2a, and the other leg portion 25b supported by a recessed portion 37 formed in the lid 30, and therefore the coil portion 25c itself is tilted.

As shown in FIG. 9, when the coil portion 25c is tilted, an upward (in the figure) component force Fv is generated. The friction loss due to the contact between the lid 30 and the upper cartridge 2a can be reduced by the component force Fv. To ensure the component force Fv, it is desirable to provide a notch or a step in the recessed portion 37 for ensuring retainment of the leg portion 25b of the lid spring 25 and also it is desirable that the inner diameter of the coil portion 25c of the lid spring 25 is 1.7 to 3 times larger than the outer diameter of the supporting shaft 14.

Figure 1:
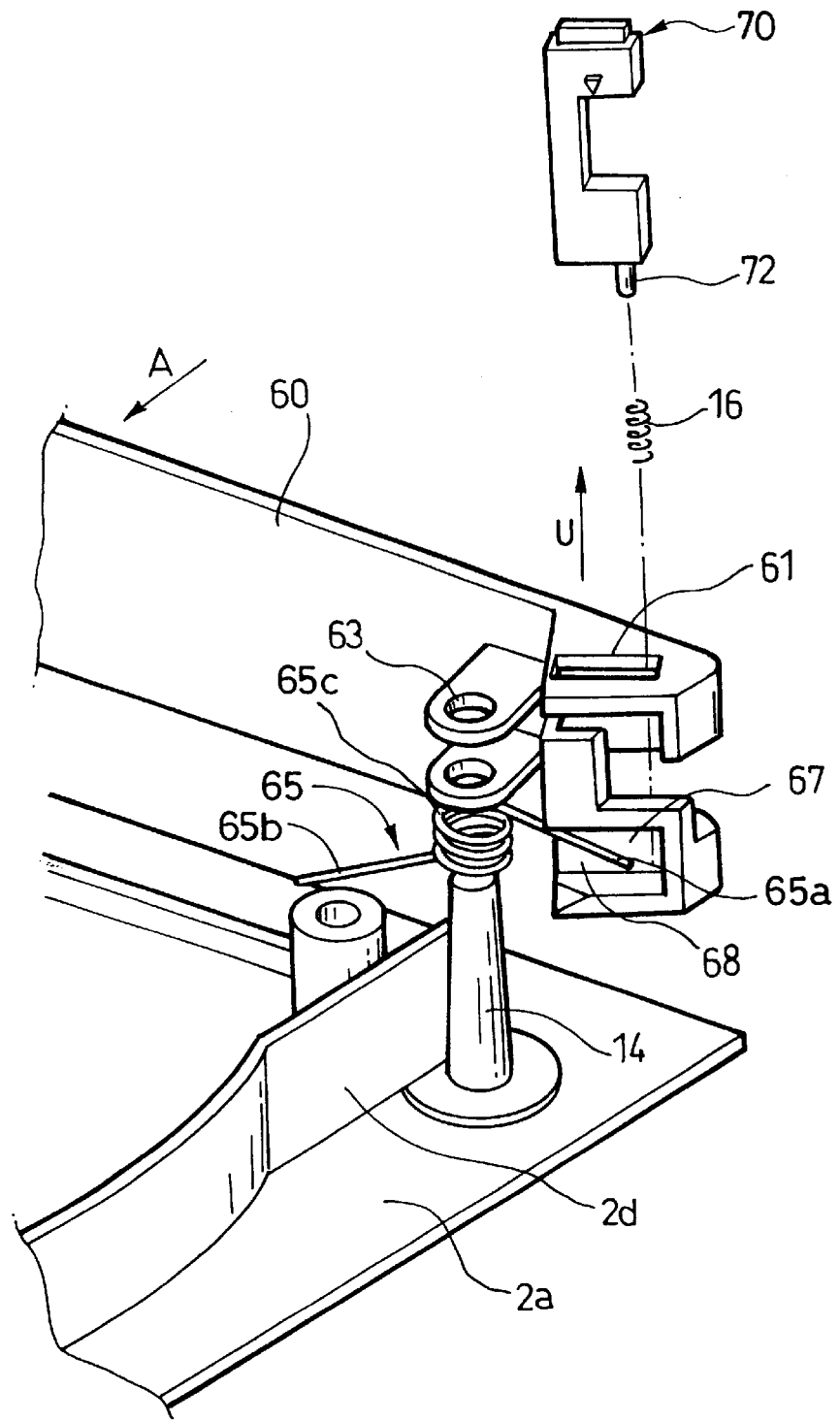
FIG. 1 shows a basic attachment structure of the lid.
Figure 2:
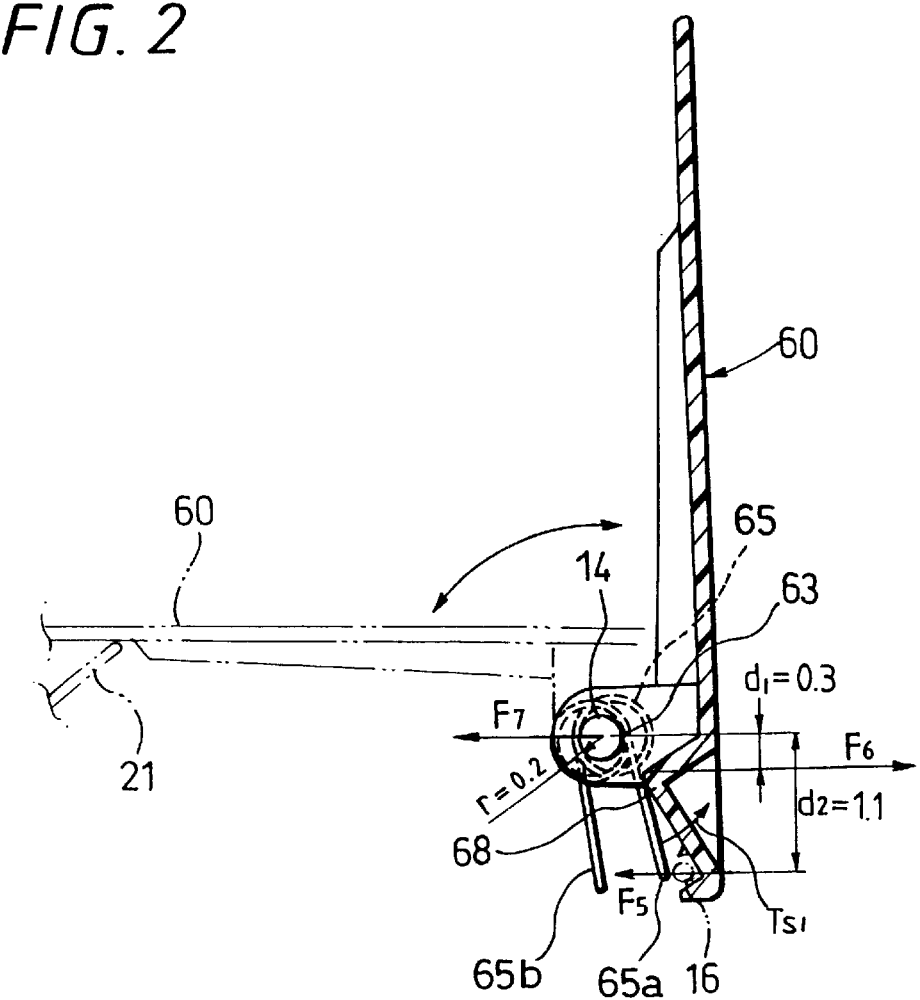
FIG. 2 shows positional and kinetic relationship between the lid and the lid spring in a static state where the lid is opened.
Figure 3:
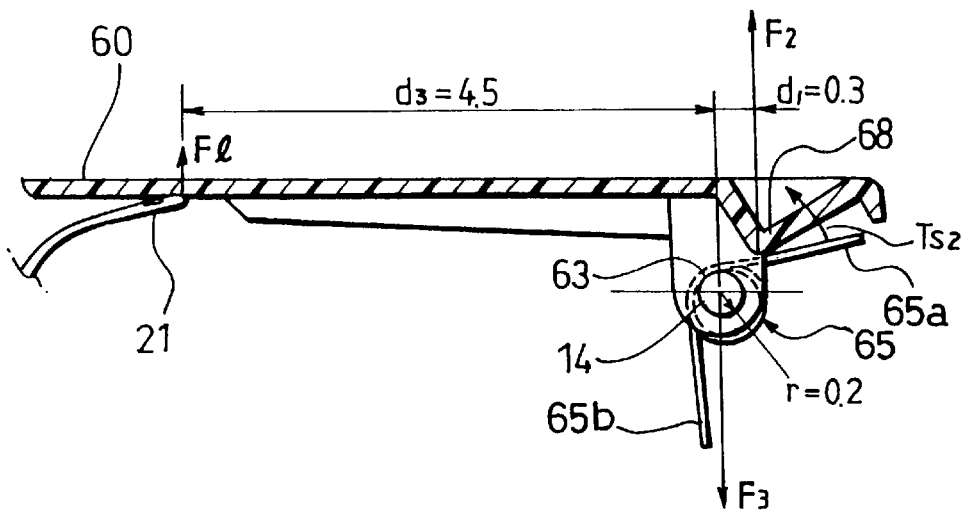
FIG. 3 shows positional and kinetic relationship between the lid and the lid spring in a static state where the lid is closed.
Figure 10:
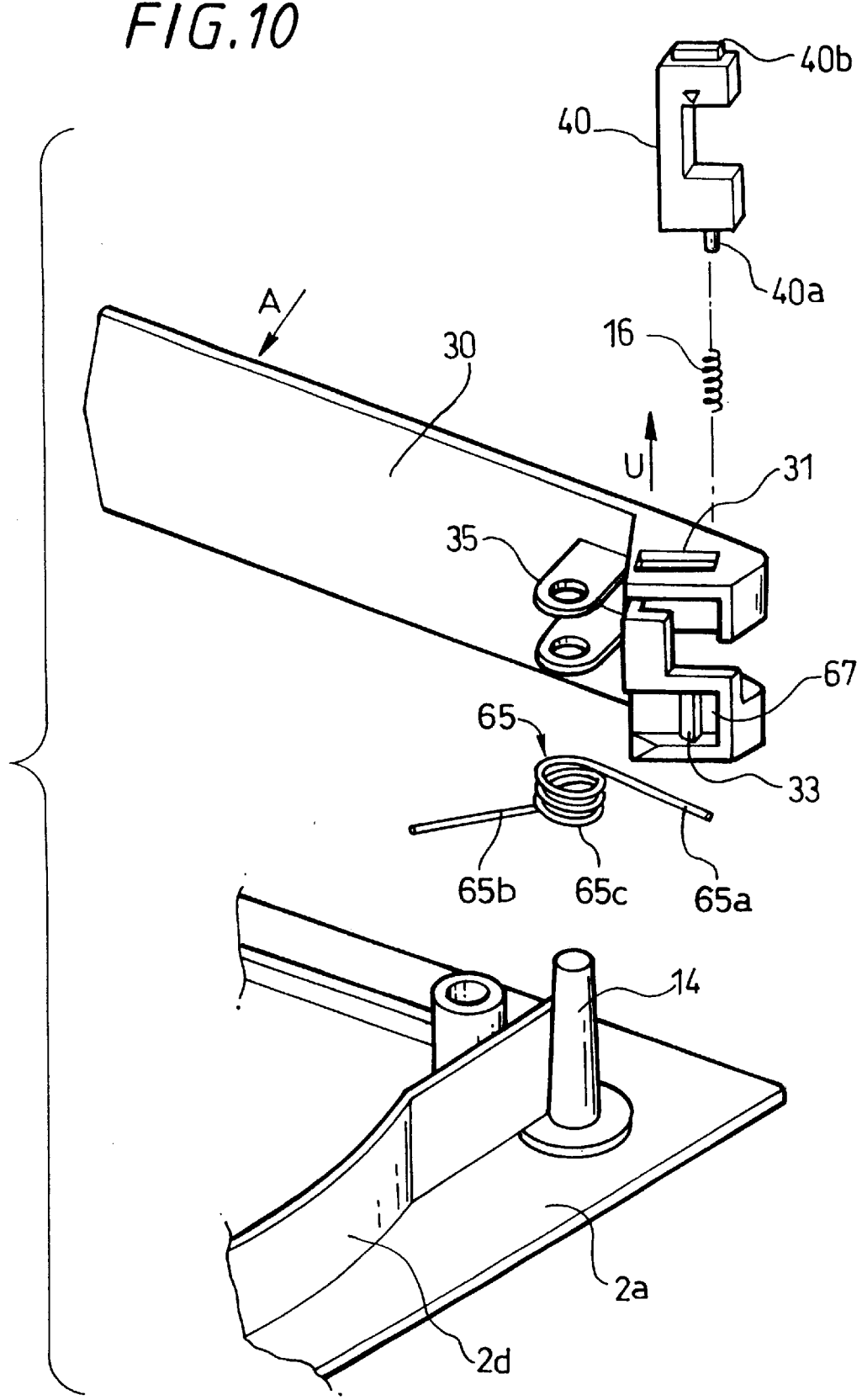
FIG. 10 is a basic attachment structure of a lid of a third embodiment according to the present invention.
Figure 11:
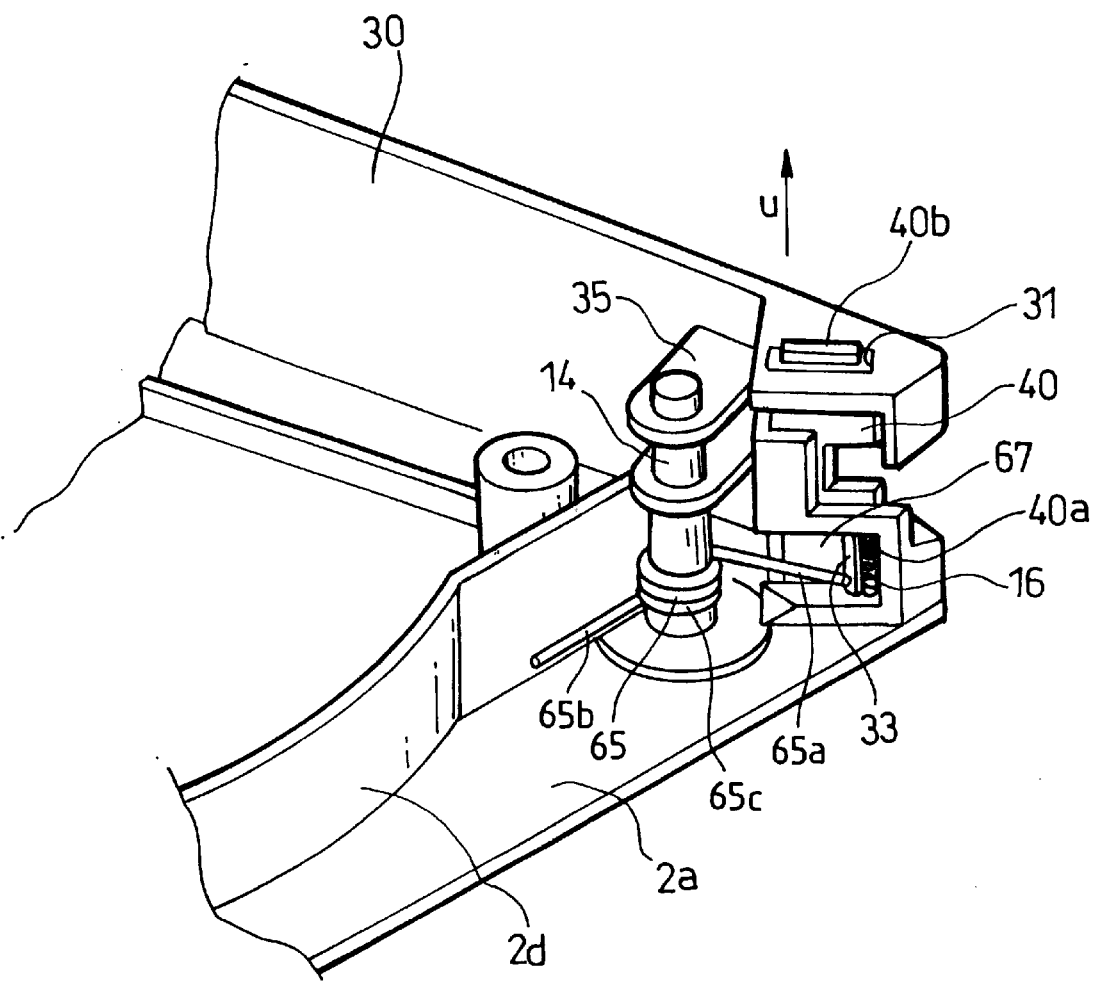
FIG. 11 shows a state in that a lid spring and the lid of FIG. 5 are attached onto a supporting shaft.

Next, a basic attachment structure of a lid of a third embodiment according to the present invention will be described with reference to FIGS. 10 to 14. As shown in FIG. 10, the lid 30 is attached to the supporting shaft 14, and is urged with a force in the closing direction indicated by the arrow A by a lid spring 65. The lid spring 65 herein is similar to those shown in FIGS. 1 to 3. As shown in FIG. 11, the lid spring 65 is attached to the supporting shaft 14 through the coil portion 65c thereof, and one leg portion 65b is supported by the frame 2d of the upper cartridge 2a while the other leg portion 65a is supported by a protruding portion 33 which is formed in a recessed portion 67 of the lid 30. The protruding portion 33, which has an approximately square prism shape, supports the leg portion 65a at a portion adjacent to the end portion of the leg portion 65a. The portion adjacent to the end portion is defined by a position where the distance between a point of action of a force of the lid spring 65 and the supporting shaft 14 is not less than twice the radius of the supporting shaft 14 and also is within the range between ½ and ⅔ of the distance between the supporting shaft 14 and a contact point of which the release lever (not shown) for opening the lid 30 contacts with the lid 30.

FIG. 11 shows a state in which the lid spring 65 and the lid 30 are attached onto the supporting shaft 14. As shown in FIG. 11, the lid lock spring 16 is stored between an inner wall of the recessed portion 67 and the protruding portion 33. The lid lock member 40 is inserted into the hole 31 of the lid 30. The lid lock spring 16 is attached to the lid lock member 40 so that the boss 40a of the lid lock member 40 is inserted into the lid lock spring 16. The lid lock member 40 can vertically slide in the hole 31, and is urged by the upward force of the lid lock spring 16 in the direction indicated by the arrow U so that an upper end portion 40b of the lid lock member 40 protrudes from the hole 31. When the protruded upper end portion 40b engages with the recessed portion formed in the lower cartridge 2b, the lid 30 cannot pivot.

Figure 12:
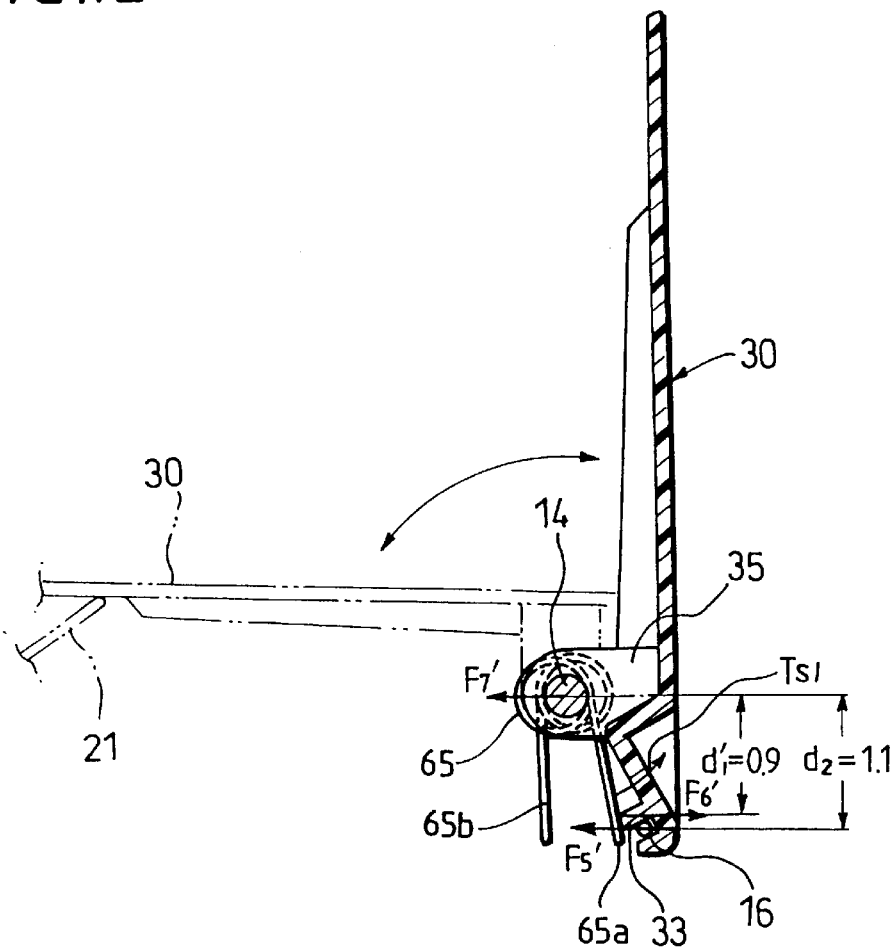
FIG. 12 shows positional and kinetic relationship between the lid and the lid spring in a static state where the lid is opened.

FIG. 12 shows positional and kinetic relationship between the lid 30 and the lid spring 65 in a static state where the lid 30 is opened while a certain torque is being loaded on the lid spring 65. As for the kinetic relationship while the lid 30 is opened, a torque $Ts_1$ of the lid spring 65 is applied to the protruding portion 33 of the lid 30 to generate a spring force F6'. An opening force F5' is applied to the lid 30 through the release lever (not shown) for opening the lid 30. A load F7' is applied on the supporting shaft 14. The load F7' is a difference between the forces F6' and F5'. Similar to the magnetic tape cartridge discussed in the background art section, the $Ts_1$ is set as 140 gfcm and a radius r of the supporting shaft 14 is 0.2 cm. A distance d1' from the center of the supporting shaft 14 to a point of action of the force F6' is 0.9 cm. A distance d2 from the center of the supporting shaft 14 to a point of action of the force F5' is 1.1 cm.

As described in the background art section, the relationship among T (torque), F (force), and d (distance) is defined as follows:

$$T \text{ (torque)} = F \text{ (force)} \times d \text{ (distance)}$$

In view of the above, the specific values of F6' and F5' are defined as follows:

$$F6' = Ts1/d1' = 155 \text{ gf}$$

$$F5' = Tsa1/d2 = 127 \text{ gf}$$

Further, the specific value of F7' is defined based on balance of forces as follows:

$$F7' = F6' - F5' = 28 \text{ gf}$$

Accordingly, if a static friction coefficient $\mu$ of the resin is set as 0.52, a friction torque Tf1' of the supporting shaft 14 is defined as follows:

$$Tf1' = F7' \times \mu r = 2.9 \text{ gfcm}$$

Figure 13:
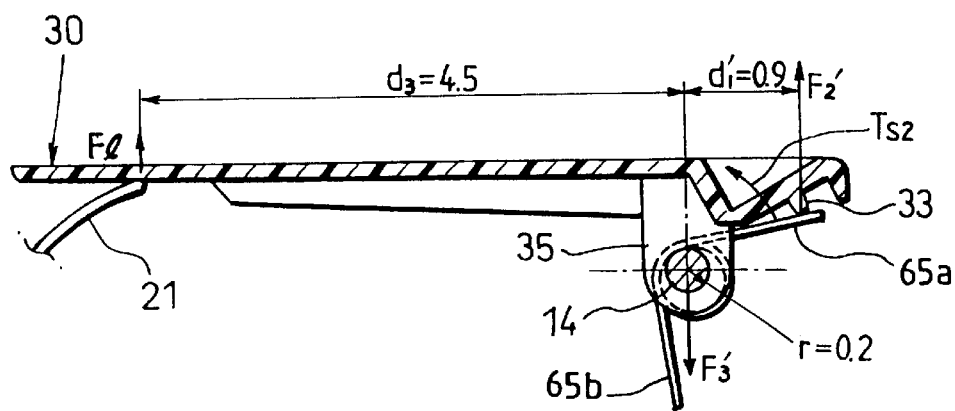
FIG. 13 shows positional and kinetic relationship between the lid and the lid spring in a static state where the lid is closed.

FIG. 13 shows positional and kinetic relationship between the lid 30 and the lid spring 65 in a static state where the lid is closed. As for the kinetic relationship while the lid 30 is closed, a torque Ts2 of the lid spring 65 is applied to the protruding portion 33 of the lid 30 to generate a spring force F2'. A counter force Fl is applied from the leader tape 21 to the lid 30. A load F3' applied to the supporting shaft 14 is a sum of F2' and Fl. Incidentally, similar to the magnetic tape cartridge discussed in the background art section, the Ts2 is 60 gfcm and the force Fl is 8 gf while the distance d3 from the center of the supporting shaft 14 to a point of action of the force Fl is 4.5 cm.

In view of the above, the specific value of F2' is defined as follows:

$$F2' = Ts2/d'1 = 67 \text{ gf}$$

Therefore, the specific value of F3' is defined as follows:

$$F3' = F2' + Fl = 75 \text{ gf}$$

Accordingly, a friction torque Tf2' of the supporting shaft 14 is defined as follows:

$$Tf2' = F3' \times \mu r = 7.8 \text{ gfcm}$$

As a result, a spare torque Tt' of the lid spring 65 in the close state of the lid 60 is defined as follows:

$$Tt' = Ts2 - (Tf2' + T1) = 16.2 \text{ gfcm}$$

(wherein T1-8×4.5=36 gfcm)

FIG. 14 is a graph showing a comparison between the friction torques respectively working on the supporting shafts of the third embodiment and the background art when the lids are opened and closed. As shown in FIG. 14, the friction torque according to the third embodiment has decreased in either case of opening and closing. Thus, generation of friction powder can be reduced, and therefore, the lid can pivot smoothly. Additionally, as described above, such a sufficient spare torque as 16.2 gfcm is obtained when the lid is being closed, and therefore the possibility of imperfect closure of the lid will not occur. Moreover, since the protruding portion 33 functions also as a guide for the lid lock spring 16, the positional stability at insertion of the lid lock spring can be enhanced.

INDUSTRIAL APPLICABILITY

As described above, according to the first embodiment of the present invention, the coil portion of the lid spring is the compressive spring. Further, according to the second embodiment of the present invention, the inner diameter of the coil portion is 1.5 times or more than the outer diameter of the supporting shaft of the upper cartridge. Therefore, when the lid is opened, compression of the lid spring results with the counter force working to counter the thrusting force of the release lever. Accordingly, the friction loss between the lid and the upper cartridge can be reduced. Furthermore, when the lid is being closed, compression of the coil portion results, in the same way, with the counter force working to counter such force as applied by the lid lock member, and therefore, the friction loss between the lid and the upper cartridge is reduced.

Therefore, the lid can pivot smoothly without being stopped halfway in the course of pivotal movement by the rotational resistance. Additionally, since this is realized only by adoption of the compressive spring for the coil portion of the lid spring, no substantial increase in the cost will result.

Furthermore, according to the third embodiment of the present invention, the load on the supporting shaft can be reduced since the lid which is disposed at the opening portion that is formed in the frame structure for drawing out this magnetic tape and which is mounted on the supporting shaft that is disposed on the upper cartridge is provided with the protruding portion that supports the leg portion of the lid spring in the vicinity of the end portion thereof. Therefore, the friction torque of the supporting shaft can be reduced to result with the reduction in the generation of friction powder and with the smooth pivot of the lid. Additionally, this is realized only by provision of the protruding portion on the lid alone and thus no substantial increase in the cost will result. Moreover, since the lid spring is supported at the portion in the vicinity of the leg end, the torque which applies a force in the direction to close the lid is increased, the problem of imperfect closure of the lid will not occur.

What is claimed is:
1. A magnetic tape cartridge, comprising:
    a cartridge case including an opening portion, an upper cartridge and a lower cartridge, the upper cartridge having a supporting shaft;

a frame formed on at least one of the upper cartridge and the lower cartridge;

a signal reel, around which a magnetic tape can be wound, accommodated in the cartridge case, wherein the magnetic tape can be drawn out from the opening portion of the cartridge case;

a lid pivotably attached to the supporting shaft in order to open and close the opening portion, the lid including a protruding portion; and a lid spring being a torsion coil spring which has:
  a coil portion through which the lid spring is attached to the supporting shaft so as to urge the lid to close the opening portion,
  one leg portion supported by the frame, and
  the other leg portion supported by the protruding portion of the lid so that a portion of the other leg portion adjacent to an end portion thereof is brought into contact with the protruding portion.

2. The magnetic tape cartridge of claim 1, wherein the protruding portion has an approximately square prism shape.

3. The magnetic tape cartridge of claim 1, wherein the lid includes a recessed portion in which the protruding portion is formed.

* * * * *

UNITED STATES PATENT AND TRADEMARK OFFICE
CERTIFICATE OF CORRECTION

PATENT NO. : 6,655,625 B2  Page 1 of 1
DATED : December 2, 2003
INVENTOR(S) : Yoichi Hayashi It is certified that error appears in the above-identified patent and that said Letters Patent is hereby corrected as shown below:

<u>Column 1</u>,
Lines 3-6, should read as follows:
-- This is a divisional of Application No. 09/622,573 filed August 18, 2000, which was the National Stage of International Application PCT/JP99/00691, filed February 17, 1999, and now U.S. Patent No. 6,488,223; the disclosure of which is incorporated herein by reference. --

Signed and Sealed this

Twenty-seventh Day of April, 2004

JON W. DUDAS
*Acting Director of the United States Patent and Trademark Office*